US010917016B2

United States Patent
Brenguier

(10) Patent No.: US 10,917,016 B2
(45) Date of Patent: Feb. 9, 2021

(54) ELECTRICAL-POWER-SUPPLYING DEVICE FOR A WALL PLUG PROVIDED WITH A CONNECTOR AND WALL PLUG PROVIDED WITH A CONNECTOR AND COMPRISING SUCH AN ELECTRICAL-POWER-SUPPLYING DEVICE

(71) Applicant: Schneider Electric Industries SAS, Rueil Malmaison (FR)

(72) Inventor: Jerome Brenguier, L'Albenc (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/147,926

(22) Filed: Oct. 1, 2018

(65) Prior Publication Data

US 2019/0103815 A1 Apr. 4, 2019

(30) Foreign Application Priority Data

Oct. 2, 2017 (FR) ...................... 17 59190

(51) Int. Cl.
*H02M 3/335* (2006.01)
*H02M 3/24* (2006.01)
(Continued)

(52) U.S. Cl.
CPC ............... *H02M 3/24* (2013.01); *H02M 1/15* (2013.01); *H02M 1/44* (2013.01); *H02M 3/04* (2013.01); *H01R 24/60* (2013.01); *H02M 3/285* (2013.01); *H02M 3/33523* (2013.01); *H02M 3/33553* (2013.01); *H02M 2001/007* (2013.01);
(Continued)

(58) Field of Classification Search
None
See application file for complete search history.

(56) References Cited

U.S. PATENT DOCUMENTS 8,644,036 B2 * 2/2014 Sato .................. H02M 3/33523
363/21.04
2009/0257248 A1 * 10/2009 Baptiste ............ H02M 3/33561
363/20
(Continued)

OTHER PUBLICATIONS

Fang, et al., "Zero Ripple Single Stage AC-DC LED Driver with Unity Power Factor," 2013 IEEE Energy Conversion Congress and Exposition, Sep. 2013, pp. 3452- 458 (Year: 2013).*
(Continued)

*Primary Examiner* — Jeffrey A Gblende
(74) *Attorney, Agent, or Firm* — Oblon, McClelland, Maier & Neustadt, L.L.P.

(57) ABSTRACT

An electrical-power-supplying device for a wall plug includes a first DC-DC power converter including a first output and a second output; a second DC-DC power converter the input of which is connected to the second output; and a first capacitor connected to the input of the first converter, a second capacitor connected to the first output and a third capacitor connected to the second output. The first output of the first converter and the output of the second converter are connected in series to form an output of the power-supplying device able to deliver a DC voltage, the power-supplying device including at least one fourth capacitor that is connected to the output of the second converter or to the output of the power-supplying device.

16 Claims, 3 Drawing Sheets

(51) Int. Cl.
    *H02M 1/44*        (2007.01)
    *H02M 3/04*        (2006.01)
    *H02M 1/15*        (2006.01)
    *H01R 24/60*        (2011.01)
    *H02M 1/00*        (2006.01)
    *H02M 3/28*        (2006.01)

(52) U.S. Cl.
    CPC .............. *H02M 2001/0077* (2013.01); *H02M 2001/0093* (2013.01)

(56) References Cited

U.S. PATENT DOCUMENTS

| | | | |
|---|---|---|---|
| 2010/0046251 A1* | 2/2010 | Kyono | H02M 3/33561 363/21.02 |
| 2012/0155119 A1* | 6/2012 | Kim | H02M 3/33561 363/17 |
| 2016/0149501 A1* | 5/2016 | Dai | H02M 3/337 363/21.02 |
| 2017/0214201 A1* | 7/2017 | Armstrong | H01R 31/06 |
| 2017/0237348 A1* | 8/2017 | Yoon | H02M 3/158 323/271 |
| 2017/0288557 A1* | 10/2017 | Fang | H02M 1/15 |

OTHER PUBLICATIONS

French Preliminary Search Report dated Jun. 15, 2018 in French Application 17 59190 filed Oct. 2, 2017 (with English Translation of Categories of Cited Documents and Written Opinion).

Peng Fang, et al., "Zero Ripple Single Stage AC-DC LED Driver with Unity Power Factor," 2013 IEEE Energy Conversion Congress and Exposition, Sep. 2013, pp. 3452-3458.

Yajie Qiu, et al., "Bipolar Ripple Cancellation Method to Achieve Single-Stage Electrolytic-Capacitor-Less High-Power LED Driver," IEEE Journal of Emerging and Selected Topics in Power Electronics, vol. 3, No. 3, Sep. 2015, pp. 698-713.

* cited by examiner

ELECTRICAL-POWER-SUPPLYING DEVICE
FOR A WALL PLUG PROVIDED WITH A
CONNECTOR AND WALL PLUG PROVIDED
WITH A CONNECTOR AND COMPRISING
SUCH AN
ELECTRICAL-POWER-SUPPLYING DEVICE

The present invention relates to an electrical-power-supplying device for a wall plug provided with a connector. The invention also relates to a wall plug provided with a connector and comprising such an electrical-power-supplying device.

Electrical wall plugs exist which comprise a connector of the USB type, in order to allow the recharging of mobile communications devices, such as electronic telephones and/or tablets equipped with a connector, with a DC electric current.

Such wall plugs are designed to be installed in buildings, for example buildings for domestic use or else in public premises such as airport waiting rooms, restaurants, hotels, and many other examples.

These connectors are generally USB connectors compatible with the "USB Power Delivery" standard. They are thus able to enable the supply of electrical power to a device according to several levels of electrical voltage and/or current.

For this purpose, these wall plugs are connected to an electrical power supply system, for example domestic, which supplies them with an AC electrical voltage, generally single phase. The plugs include an electrical-power-supplying device designed to supply a regulated DC power supply voltage at the output, starting from the power supply voltage received and destined for the USB connector.

The known wall plugs are not however entirely satisfactory owing to certain limitations of their power-supplying device.

Typically, the existing low-power power supplies comprise a power converter associated with passive components, such as capacitors.

For example, the input of the converter is filtered by means of one or more capacitors of high capacitance, generally higher than several tens of microFarads. These capacitors generally use an electrolytic technology containing aluminium, for reasons of cost but also in view of the high values of capacitance required. A regulation of the converter is provided by means of a feedback loop which measures the voltage at the output of the converter. This loop may comprise an opto-coupler which participates in the electrical isolation of the converter.

These known power supplies nevertheless have a certain number of drawbacks in the present case.

On the one hand, these power supplies are bulky, notably because of the electrolytic capacitors, which is not compatible with the fact that the dimensions of the plug are limited, notably by the size of wall cavities designed to accommodate them. Indeed, for reasons of compatibility with existing buildings, it is desirable for such wall plugs to have dimensions comparable with those of the existing electrical wall plugs. Indeed, their dimensions are often defined by standards from which it is difficult to derogate.

On the other hand, these power supplies are not very efficient, such that a significant part of the supply power received by the system is dissipated in the form of heat. However, as the plug is, at least in part, recessed into a wall, it is located within a confined space, which complicates the evacuation of the heat dissipated, all the more so as the walls of buildings typically comprise thermal insulation devices, which further complicates the evacuation of the heat.

Moreover, certain components of these power supplies, such as the electrolytic capacitors or the opto-coupler, have a limited lifetime, for example in some cases less than three years, which reduces the lifetime of the plug. This is unacceptable since the plug is designed to be permanently fixed into a wall and is not intended to be replaced regularly. The lifetime of these components is even more reduced when they have to operate under a high temperature, as is often the case when the plug is fixed to a wall, owing to the difficulties in evacuating the heat dissipated for the aforementioned reasons.

It is these drawbacks that the invention more particularly intends to overcome by providing an improved electrical power supply for a USB wall plug, having a compact shape, a limited thermal dissipation and an increased lifetime.

For this purpose, the invention relates to an electrical-power-supplying device for a wall plug provided with an electrical connector, this electrical-power-supplying device comprising:
  a rectifier, designed to be powered by a source of AC electrical voltage;
  a first DC-DC power converter, comprising:
    an input connected to the output of the rectifier;
    a first output and a second output, the average electrical power delivered on the second output being less than the average electrical power delivered on the first output;
  a second DC-DC power converter, the input of the second power converter being connected to the second output of the first power converter;
  a first filtering capacitor connected to the input of the first power converter, a second filtering capacitor connected to the first output, a third filtering capacitor connected to the second output;
  and characterized in that the first output of the first power converter and the output of the second power converter are connected in series so as to form an output of the electrical-power-supplying device able to deliver a DC power supply voltage, the electrical-power-supplying device comprising at least a fourth filtering capacitor connected either to the output of the second converter or to the output of the electrical-power-supplying device.

By virtue of the invention, the association of the two power converters allows the power supply connector to be powered in a reliable manner and overcoming the aforementioned drawbacks.

As the second converter is connected to the second output, through which an average power which is only a small fraction of the output power of the first converter flows, then the dimensions of the second converter may be reduced. The space it occupies is therefore reduced. With regard to the losses due to the connection in series of two converters, these are also reduced. This second converter nevertheless allows a sufficiently precise regulation of the output voltage to be achieved, which allows all or part of the feedback loop commonly used to be eliminated.

By virtue of the disposition of the two converters and to the two outputs of the first converter, the power-supplying device is able to supply a stabilized voltage at the output, even when the AC power supply voltage goes through a zero value. In contrast, the known power-supplying devices achieve this by storing energy in the capacitor situated at the input of the first converter, which requires this capacitor to have a high capacitance. By virtue of the invention, since this storage is not necessary, it is possible to use capacitors having much lower capacitance values, which makes possible the use of capacitor technologies which are more reliable and less bulky than the electrolytic capacitors typical used.

According to advantageous, but not obligatory, aspects of the invention, such a device may incorporate one or more of the following features, taken in isolation or according to any technically admissible combination:

The fourth filtering capacitor is connected to the output of the second power converter and in that the electrical-power-supplying device comprises a fifth filtering capacitor connected to its output.

The first power converter is a converter of "flyback" type.

The second power converter is a converter of the "buck" or of the "buck-boost" type.

The second power converter is configured in such a manner that the voltage delivered at the output of this second power converter is complementary to the voltage that it receives on its input.

The capacitors are capacitors using ceramic technology or tantalum technology or polymer technology.

The first capacitor has a capacitance of less than 1 milliFarad.

The average electrical power delivered on the second output is at least two times lower than the average electrical power delivered on the first output, preferably ten times lower than the average electrical power delivered on the first output.

The first power converter is galvanically isolated.

The second power converter has a nominal power less than the nominal power of the first power converter.

According to another aspect, the invention relates to a wall plug comprising a housing designed to be fixed to a wall, a power supply connector and an electrical-power-supplying device designed to supply the connector starting from an AC voltage supplied by an electrical supply system, the electrical-power-supplying device being such as previously described.

According to advantageous, but not obligatory, aspects of the invention, such a plug may incorporate a power supply connector of the USB type.

The invention will be better understood and other advantages of the latter will become more clearly apparent in the light of the description of one embodiment of an electrical-power-supplying device that follows presented solely by way of example and with reference to the appended drawings in which.

Figure 1:
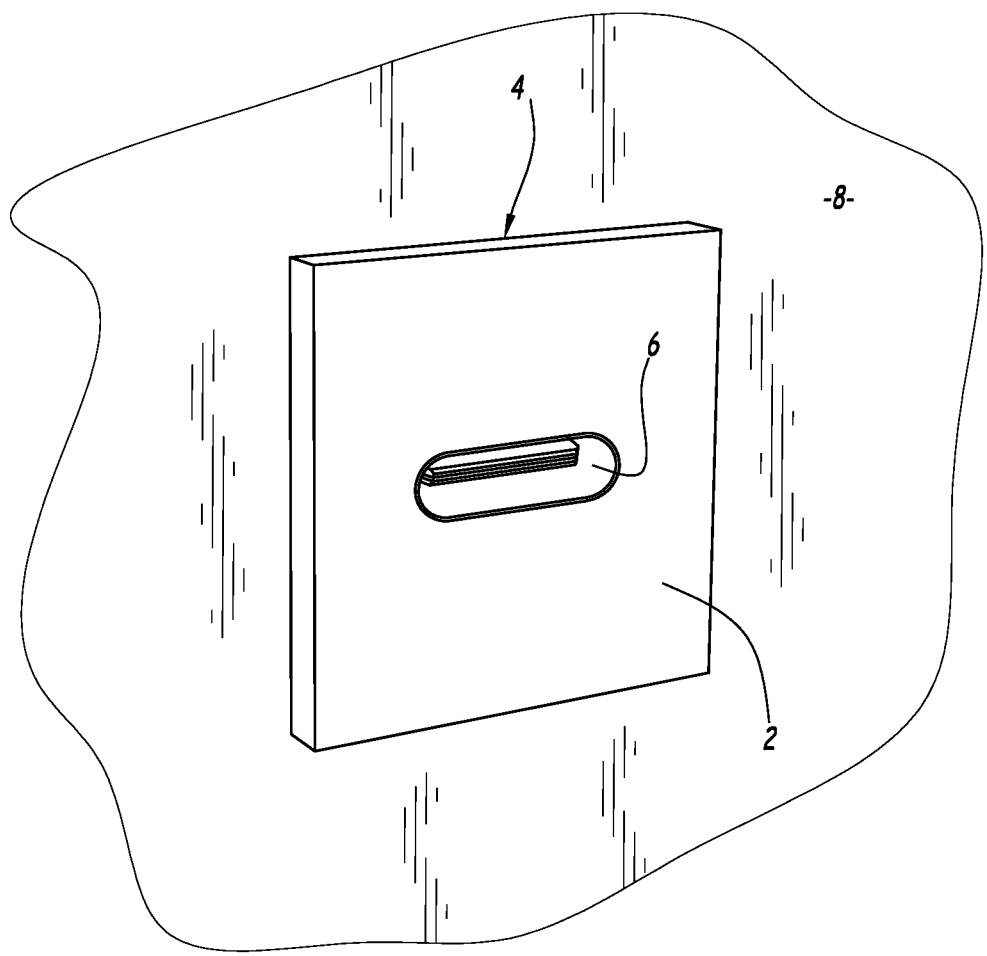
FIG. 1 is a schematic representation of a wall plug USB according to the invention.

FIG. 1 shows a wall plug 2 comprising a housing 4 and a connector 6 for an electrical power supply.

The plug 2 is designed to be fixed onto a wall 8, such as a wall of a building. For example, the housing 4 is designed to, at least in part, be accommodated inside of a cavity formed in the wall 8.

As a variant, the housing 4 may be mounted protruding from the wall 8.

The housing 4 advantageously comprises fixing means, such as screws, in order to enable it to be fixed to the wall 8.

Here, "fixing onto the wall 8" is understood to mean that the plug 2 is designed to be rigidly attached in a durable and permanent manner onto the wall 8. In other words, it is not intended to be removed by a user, except potentially during maintenance operations. Thus, the plug 2 is not equivalent to a removable adapter plugged into a mains socket of a building.

Here, the housing 4 is made of a plastic material. It is advantageously formed by assembling one or more separable shells.

The connector 6 is designed to allow the electrical connection of an electrical device with a view to electrically powering this device, for example for its operation or for recharging a battery equipping this device.

More precisely, the plug 2 is designed to supply a DC electrical power supply voltage to an external device by means of the connector 6.

In this example, the connector 6 is a connector of the USB (Universal Serial Bus) type.

By way of illustrative example, the connector 6 here is a type C USB connector allowing the supply of a higher electrical power. The type C connector also offers the advantage of having a reversible connection orientation. However, as a variant, other types of USB connector may be used, in particular the more conventional type A USB connector.

Figure 2:
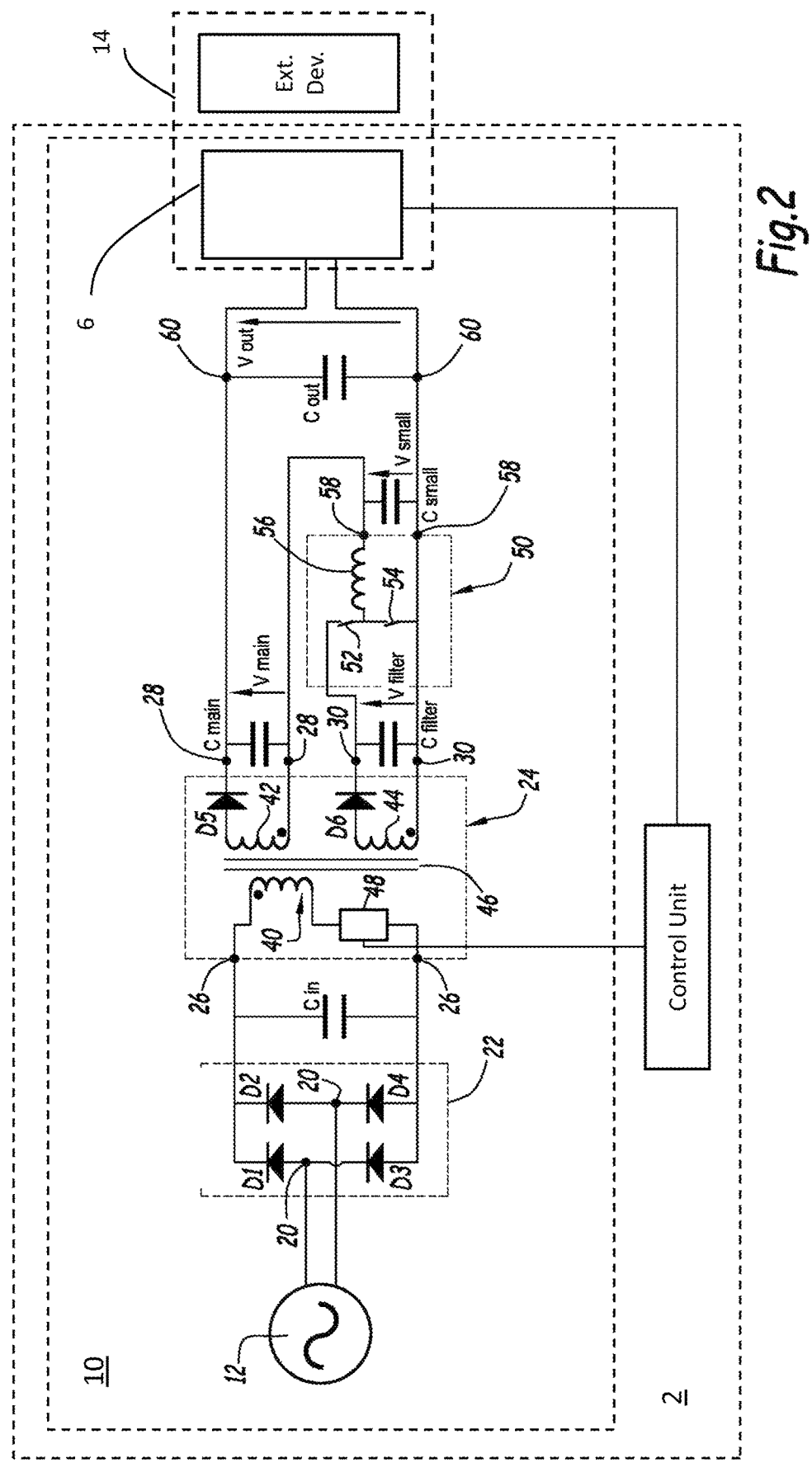
FIG. 2 is a schematic representation of an electrical-power-supplying device of the wall plug in FIG. 1.

The plug 2 comprises an electrical-power-supplying device 10, one example of which is illustrated in more detail in FIG. 2.

The device 10 is configured so as to be powered by an AC electrical voltage and so as to supply, at the output, on the connector 6, a stabilized DC electrical voltage.

The AC electrical voltage powering the device 10 comes for example from an electrical supply system, of the mains type, to which the plug 2 is connected. For example, the plug 2 is connected to this power supply system by means of connection terminals coming out inside the wall cavity.

In this example, the electrical supply system delivers an AC voltage of the 230V at 50 Hz type. As a variant, other values are possible, such as an AC voltage of the 110V at 60 Hz type.

For example, the device 10 is accommodated inside of the housing 4. In this example, the components of the device 10 are mounted on an electronic board which is accommodated inside of the housing 4.

Advantageously, the plug 2 comprises a control unit in order to control the operation of the device 10.

In particular, the control unit is programmed to fix the value of the DC output voltage delivered on the connector 6, for example as a function of a control signal received from the power-supplying device. For example, when a device is connected to the plug 2, by means of the connector 6, it sends an appropriate signal to the control unit, in order to request it to be powered with a voltage and a current that correspond to properties of this device. In response, the control unit chooses an appropriate output voltage.

In this example, the USB connectors are compatible with the "USB power delivery" standard. They therefore allow a device to choose between several levels of electrical power supply, for example 5 V with 1.5 amps, or 9 V with 3 amps, or 15 V with 3 amps or else 20 V with 5 amps.

In FIG. 2, the reference "12" represents a source of AC voltage. In this example, this is the electrical supply system that powers the device 10.

The reference "14" represents an electrical load intended to be powered by a DC electrical voltage. In this example, the load 14 represents an electrical device connected to the plug 2, by means of the connector 6, with a view to powering it and/or recharging it.

The device 10 here comprises an input 20 comprising two electrical terminals connected to the source 12.

The device 10 also comprises a rectifier 22 and a first power converter 24 of the DC-DC type.

The rectifier 22 is connected across the terminals of the input 20 so as to be powered by the source 12. The output of the rectifier 22 is connected to an input 26 of the first converter 24.

In this example, the rectifier 22 is a diode bridge comprising four diodes D1, D2, D3 and D4.

The device 10 comprises a first filtering capacitor Cin connected to the input 26, between the terminals of the input 26.

The first converter 24 also comprises a first output 28 and a second output 30, distinct from one another. During its operation, the first converter 24 delivers an electrical power at the output on each of the outputs 28 and 30.

The average electrical power delivered on the second output 30 is less than the average electrical power delivered on the first output 28. Preferably, the average electrical power delivered on the second output 30 is two times lower, and preferably ten times lower, than the average electrical power delivered on the first output 28.

Advantageously, the first converter 24 is galvanically isolated. For example, the level of electrical isolation corresponds to the "OVC III" isolation level such as defined by the standard IEC-60664-1 of the International Electrotechnical Commission. Thus, the device 10 has an electrical isolation which avoids posing any risks to users.

In this example, the first converter 24 is a converter of the "flyback" type.

More precisely, the first converter 24 here comprises a transformer comprising a primary winding 40, a first secondary winding 42 and a second secondary winding 44 which are wound around a common ferromagnetic core 46 of the transformer. In a known manner, these windings, or solenoids, are formed by winding conducting wires around the core 46.

The primary winding 40 is connected in series with a regulation circuit 48 between the terminals of the input 26. The regulation circuit 48 here comprises a controllable switch. The switch is actuated with a predefined switching frequency, for example by being controlled by the control unit of the plug 2.

By way of illustration, the switching frequency of the circuit 48 here is equal to 140 kHz.

The regulation circuit 48 here is controlled as a function of a regulation voltage, measured by means of an auxiliary winding, not shown, wound around the core 46, on the primary of the transformer.

The first winding 42 is connected to the first input 28. Advantageously, a diode D5 is connected in series with the first winding 42 so as to prevent a transfer of electrical power from the first output 28 to the input 26.

Similarly, the second winding 24 is connected to the second output 30. Advantageously, a diode D6 is connected in series with the second winding 44 in order to avoid any transfer of electrical power from the second output 30 to the input 26.

The device 10 furthermore comprises a second filtering capacitor Cmain connected to the first output 28 and a third filtering capacitor Cfilter connected to the second output 30.

More precisely, the capacitors Cmain and Cfilter are connected in parallel with the corresponding outputs 28, 30, respectively.

The electrical voltage across the terminals of the second capacitor CMain is denoted "Vmain" and the electrical voltage across the terminals of the third capacitor Cfilter is denoted "Vfilter".

The device 10 furthermore comprises a second DC-DC power converter 50, whose input is connected to the second output 30.

Advantageously, the nominal power of the converter 50 is less than the nominal power of the first converter 24. For example, the nominal power of the second converter 50 is equal to 10% of the nominal power of the first converter 24.

In this example, the second converter 50 is a converter of the "buck" type. In a known manner, this converter 50 here comprises controllable power switches 52 and 54 associated with an inductor 56.

As a variant, the second converter 50 may be of a different nature. For example, it may be a converter of the "buck-boost" type.

The output of the second power converter 50 is denoted "58".

The device 10 furthermore comprises a fourth filtering capacitor Csmall which is connected to the output 58, in parallel with the latter. The electrical voltage across the terminals of this fourth capacitor Csmall is denoted "Vsmall".

The first output 28 of the first converter 24 and the output 58 of the second converter 50 are connected together in series so as to form an output 60 of the device 10.

By way of exemplary illustration, the electrical power supplied at the output of the device 10 here is less than 100 W.

In this example, a first terminal of the output 60 is connected to a first terminal of the first output 28. A second terminal of the output 60 is connected to a first terminal of the output 58 of the second converter 50. The second terminal of the first output 28 and the second terminal of the output 58 of the second converter 50 are connected together by an electrical conductor.

The device 10 furthermore comprises a fifth filtering capacitor Cout connected to the output 60 in parallel with the latter. "Vout" denotes the electrical voltage across the terminals of this fifth capacitor Cout. Here, the voltage Vout corresponds to the DC voltage which is delivered at the output of the device 10 destined for a corresponding electrical device, here illustrated by the electrical load 14 connected to the plug via the connector 6.

As a variant, however, one or the other of the fifth capacitor Cout or of the fourth capacitor Csmall may be omitted.

In other words, at least a fourth filtering capacitor Csmall or Cout is connected either to the output 58 of the second converter or to the output 60 of the electrical-power-supplying device 10.

When the fifth capacitor Cout is omitted, the voltage Vout corresponds to the electrical voltage between the output terminals 60. In an analogous manner, when the fourth capacitor Csmall is omitted, the voltage Vsmall corresponds to the electrical voltage between the terminals of the output 58.

Owing to the connection in series of the outputs 28 and 58, the voltage Vout is equal to the sum of the voltages Vmain and Vsmall.

Preferably, each of the capacitors Cin, Cmain, Cfilter, Csmall, Cout has a capacitance which is less than 1 mF and, preferably, less than or equal to 100 µF. In particular, the first capacitor Cin has a capacitance less than or equal to 100 µF, here equal to 10 µF.

The capacitors Cin, Cmain, Cfilter, Csmall, Cout here are made of ceramic. As a variant, they may use a technology of the tantalum or polymer type or any other equivalent technology. Thus, these capacitors Cin, Cmain, Cfilter, Csmall, Cout are not capacitors using aluminium electrolytic technology.

In this description, for simplicity, each of the capacitors Cin, Cmain, Cfilter, Csmall, Cout is illustrated as a single component although, in practice, each capacitor Cin, Cmain, Cfilter, Csmall, Gout may in reality be formed by a battery of two or more capacitors connected together in parallel, for example within the same single module.

Here, the regulation of the second converter 50 is carried out by measuring the voltage Vsmall downstream of the fourth capacitor Csmall. The switching frequency of the converter 50 is, in this case, equal to 1 MHz.

The second converter 50 is adapted, notably via its regulation strategy, so that the output voltage Vsmall is, at all times, complementary to the input voltage Vfilter. For example, when the voltage Vfilter at the input has a maximum amplitude, then the output voltage Vsmall has a minimum amplitude. When the input voltage Vfilter decreases, the output voltage Vsmall accordingly increases. In an analogous manner, when the input voltage Vfilter increases once again, then the output voltage Vsmall decreases as a consequence, in such a manner that the voltage Vout remains constant and has the least possible variation and ripple.

Figure 3:
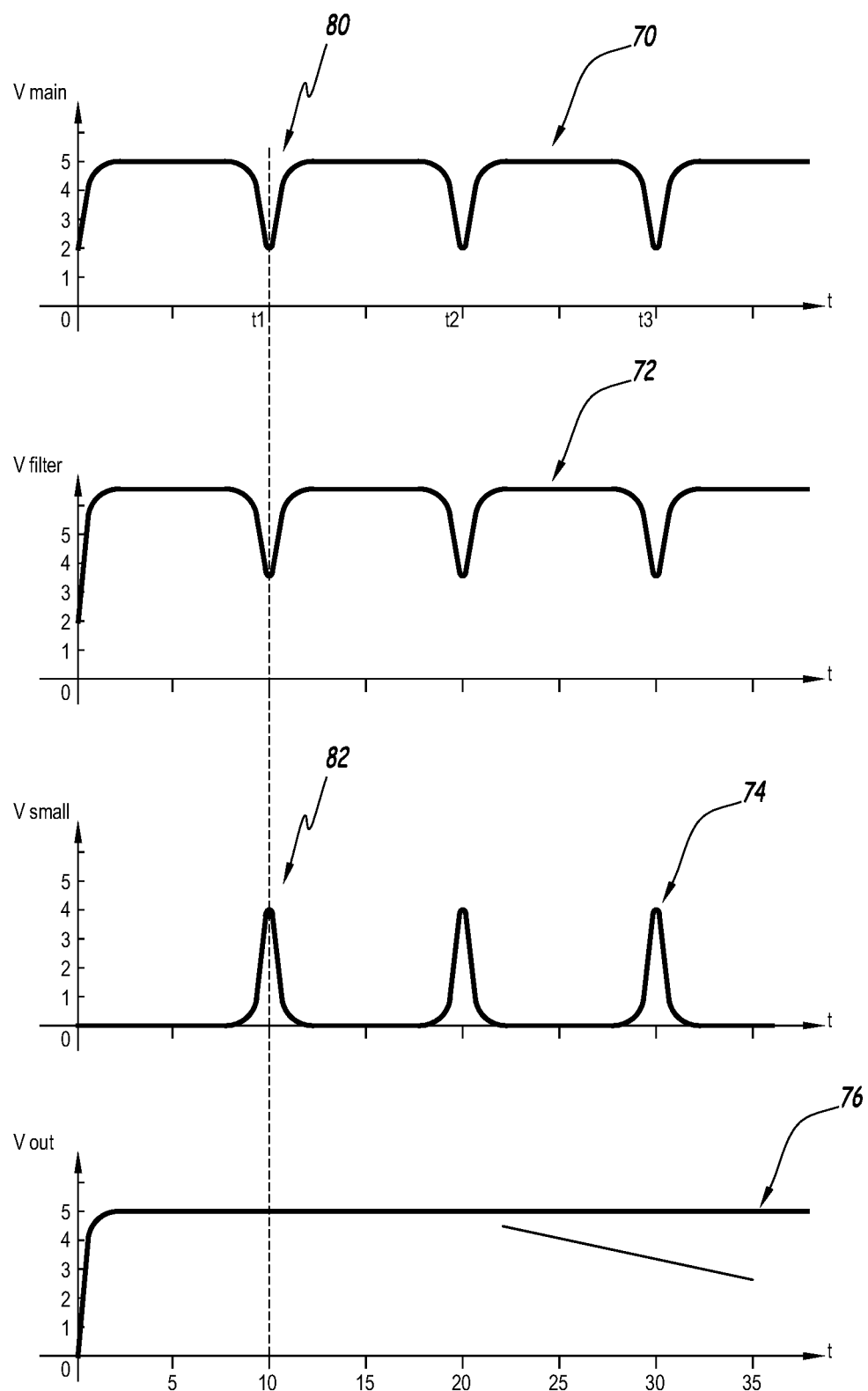
FIG. 3 is a schematic representation of the variation, over time, of values of electrical voltages within the power-supplying device in FIG. 2 during its operation.

FIG. 3 shows schematically one example of operation of the device 10 over time.

The curve 70 shows the variation profile of the amplitude of the voltage Vmain as a function of time T. The curve 72 shows the variation profile of the amplitude of the voltage Vfilter as a function of time T. The curve 74 shows the variation profile of the amplitude of the voltage Vsmall as a function of time T. Finally, the curve 76 shows the variation profile of the amplitude of the output voltage Vout of the device 10 as a function of time t.

In this exemplary illustration, corresponding to the case of an electrical power supply system delivering an AC voltage with a frequency of 50 Hz, the amplitudes are expressed in Volts and the time t is expressed in milliseconds, with a pitch of 5 milliseconds for each graduation of the abscissa axis.

During the operation of the device 10, the voltages Vmain and Vfilter delivered at the output of the first capacitor 24 have amplitudes that periodically decrease owing to the voltage drops at the output of the first converter 24, which occur when the latter cannot maintain its power delivered at the output since not receiving a sufficient electrical power at the input, for example each time that the AC voltage received on the input 20 goes through a zero amplitude value. In the example illustrated, these reductions occur for the times denoted t1, t2 and t3, here every 10 ms for a power system with a 50 Hz input. One of these reductions is illustrated on the curve 70 by the reference 80.

The second converter 50 is therefore configured for, by way of its regulation, supplying at the output a voltage which compensates for the voltage drops appearing at the output of the first converter. Thus, the voltage Vsmall has increases in value for the times t1, t2 and t3. One of these increases is illustrated here by the reference 82.

Due to the fact that the voltages Vmain and Vsmall are added to provide the output voltage Vout, as previously explained, then the increase 82 will compensate for the voltage drop 80, which allows the output voltage to have an essentially constant value equal to a setpoint value.

Thus, a simple and effective regulation of the output voltage Vout is accordingly obtained.

This regulation is achieved without needing to use, at the input of the first converter 24, filtering using capacitors with a high capacitance. This makes possible the use ceramic capacitors, which are more reliable and which take up less space than electrolytic capacitors comprising aluminium commonly used. This allows the device 10, and hence the plug 2, to be compact.

The energy efficiency of the device 10 is also satisfactory, for example greater than or equal to 90%, despite the fact that two power converters are connected in series with each other.

In fact, here, as the second converter 50 is connected to the second output 30 which only delivers a small fraction of the total electrical power delivered at the output first capacitor 24, the losses in efficiency with respect to the case where the first converter 24 only comprised one output to which the second converter were connected are limited. In such a case, the losses specific to each converter would totally add up, such that the energy efficiency of the device 10 would be much less.

Furthermore, with this arrangement, the second converter 50 may be smaller than the first converter 24, resulting in the space occupied by the second converter 50 being reduced.

Thus, the device 10 is less bulky which facilitates the integration of the plug 2. By avoiding the use of fragile components having a limited lifetime, the reliability of the device 10 and of the plug 2, together with their mean lifetime, are improved with respect to the known plugs. By virtue of the excellent energy efficiency, the thermal losses of the device 10 are limited, which renders the problem of the evacuation of the heat dissipated when the plug 2 is embedded into a wall 8 less critical.

The embodiments and the variants envisaged hereinabove may be combined together to generate new embodiments.

The invention claimed is:

1. An electrical-power-supplying device for a wall plug comprising:
    an electrical connector configured to connect to an external device to supply power to the external device when the external device is connected to the electrical connector;
    a control unit configured to receive from the external device a signal indicating a power level to be supplied to the external device;
    a rectifier, designed to be powered by a source of AC electrical voltage;
    a first switchable DC-DC power converter, comprising:
        first and second connections connected to the output of the rectifier;
        a switch interposed between the first and second connections and switchably disconnecting the rectifier from the first switchable DC-DC power converter at a first switching frequency being controlled by the control unit in order to provide the power level to be supplied to the external device;
        a first output and a second output, an average electrical power delivered on the second output being less than an average electrical power delivered on the first output;
    a switchable second DC-DC power converter, an input of the second power converter being connected to the second output of the first power converter, wherein the second power converter is configured such that a voltage delivered at an output of the second power converter is complementary to a voltage received by the input of the second power converter;
a first filtering capacitor connected to the first and second connections of the first power converter;
a second filtering capacitor connected to the first output;
a third filtering capacitor connected to the second output, wherein the first output of the first power converter and the output of the second power converter are connected in series in order to form an output of the electrical-power-supplying device able to deliver a DC power supply voltage; and
a fourth filtering capacitor connected to the output of the electrical-power-supplying device.

2. The electrical-power-supplying device according to claim 1, further comprising a fifth filtering capacitor connected to the output of the second power converter.

3. The electrical-power-supplying device according to claim 1, wherein the first power converter is a converter of the "flyback" type.

4. The electrical-power-supplying device according to claim 1, wherein the second power converter is a converter of the "buck" type or of the "buck-boost" type.

5. The electrical-power-supplying device according to claim 1, wherein the capacitors are capacitors using ceramic technology or tantalum technology or polymer technology.

6. The electrical-power-supplying device according to claim 1, wherein the first capacitor has a capacitance of less than 1 milliFarad.

7. The electrical-power-supplying device according claim 1, wherein the average electrical power delivered on the second output is at least two times lower than the average electrical power delivered on the first output.

8. The electrical-power-supplying device according to claim 1, wherein the first power converter is galvanically isolated.

9. The electrical-power-supplying device according to claim 1, wherein the second power converter has a nominal power less than the nominal power of the first power converter.

10. A wall plug comprising:
a housing designed to be fixed onto a wall;
a power supply connector;
an electrical-power-supplying device designed to power the connector starting from an AC voltage supplied by an electrical supply system;
wherein the electrical-power-supplying device is according to claim 1.

11. A wall plug according to claim 10, wherein the power supply connector is of a USB type.

12. The electrical-power-supplying device according claim 1, wherein the average electrical power delivered on the second output is ten times lower than the average electrical power delivered on the first output.

13. The electrical-power-supplying device according to claim 1, wherein a second switching frequency of the second power converter is 1 MHz.

14. The electrical-power-supplying device according to claim 1, wherein the first switching frequency of the first power converter is 140 kHz.

15. The electrical-power-supplying device according to claim 1, wherein the signal indicating the power level to be supplied to the external device is a signal indicating any one of 5 volts, 9 volts, 15 volts and 20 volts.

16. The electrical-power-supplying device according to claim 1, wherein the signal indicating the power level to be supplied to the external device is a signal indicating any one of 1.5 amp, 3 amp and 5 amp.

* * * * *